(12) United States Patent
Novikov et al.

(10) Patent No.: US 11,946,130 B2
(45) Date of Patent: Apr. 2, 2024

(54) METHOD OF MANUFACTURING ZIRCONIUM ALLOY TUBULAR PRODUCTS

(71) Applicant: JOINT-STOCK COMPANY "TVEL", Moscow (RU)

(72) Inventors: Vladimir Vladimirovich Novikov, Moscow (RU); Aleksandr Anatolevich Kabanov, Moscow (RU); Antonina Vasilevna Nikulina, Moscow (RU); Vladimir Andreevich Markelov, Moscow (RU); Mihail Nikolaevich Sablin, Moscow (RU); Nadezhda Konstantinovna Filatova, Moskovskaya Oblast (RU); Vadim Nikolaevich Solovev, Moscow (RU); Kirill Vladimirovich Ozhmegov, Moskovskaya Oblast (RU); Sergei Vladimirovich Chineikin, Glazov (RU); Sergei Vasilevich Lozitckii, Glazov (RU); Aleksandr Gusmanovich Ziganshin, Glazov (RU)

(73) Assignee: JOINT-STOCK COMPANY "TVEL", Moscow (RU)

( * ) Notice: Subject to any disclaimer, the term of this patent is extended or adjusted under 35 U.S.C. 154(b) by 0 days.

(21) Appl. No.: 17/059,989

(22) PCT Filed: Dec. 26, 2019

(86) PCT No.: PCT/RU2019/001025
§ 371 (c)(1),
(2) Date: Nov. 30, 2020

(87) PCT Pub. No.: WO2021/133196
PCT Pub. Date: Jul. 1, 2021

(65) Prior Publication Data
US 2022/0316040 A1    Oct. 6, 2022

(51) Int. Cl.
*C22F 1/18*    (2006.01)
*B21B 37/78*   (2006.01)
*C22C 16/00*   (2006.01)
*C22F 1/00*    (2006.01)

(52) U.S. Cl.
CPC .............. *C22F 1/186* (2013.01); *B21B 37/78* (2013.01); *C22C 16/00* (2013.01); *C22F 1/008* (2013.01)

(58) Field of Classification Search
CPC ........... C22F 1/186; C22C 16/00; C25D 5/38; C25D 3/04; C25D 3/50; C25D 3/56; C23F 17/00
USPC ........ 72/367.1, 368, 370.13, 370.14, 370.23, 72/370.24
See application file for complete search history.

(56) References Cited

U.S. PATENT DOCUMENTS

| | | | | |
|---|---|---|---|---|
| 4,094,706 A | * | 6/1978 | Schulson ................. | G21C 3/07 148/672 |
| 4,765,174 A | * | 8/1988 | Cook ...................... | B21C 37/06 72/370.24 |
| 5,560,790 A | * | 10/1996 | Nikulina .................. | G21C 3/07 148/672 |
| 2011/0002433 A1 | * | 1/2011 | Hallstadius ............. | B32B 15/01 148/519 |
| 2019/0168274 A1 | * | 6/2019 | Shipley ................... | C22C 38/40 |

* cited by examiner

*Primary Examiner* — Ricardo D Morales
(74) *Attorney, Agent, or Firm* — J. Miguel Hernandez; James R. Gourley; Carstens, Allen & Gourley, LLP

(57) ABSTRACT

Method of manufacturing zirconium alloy tubular products containing (wt. %): niobium—0.9-1.7; iron—0.04-0.10; oxygen—0.03-0.10; silicon—less than 0.02, carbon—less than 0.02, and zirconium—as the base of the alloy. This includes an ingot melting by multiple vacuum arc remelting, mechanical processing of the ingot, heating, hot working of the ingot, subsequent mechanical processing for the production of tubular billets, heat treatment of the tubular billets, application of a protective coating and heating to a hot pressing temperature, hot pressing, removal of the protective coating, multi-stage cold radial forging, vacuum thermal treatment, multiple cold rolling runs with a total deformation degree of 50-80-% per run and a tubular coefficient of Q=1.0-2.7 with intermediate vacuum thermal treatment after each cold rolling operation, and final vacuum thermal treatment of the resulting tubular products carried out at the final size with subsequent final finishing operations.

9 Claims, No Drawings

METHOD OF MANUFACTURING ZIRCONIUM ALLOY TUBULAR PRODUCTS

CROSS-REFERENCE TO RELATED DISCLOSURE

This application is a U.S. National Stage of International Application No. PCT/RU2019/001025, filed on Dec. 26, 2019, titled "Method of Manufacturing Zirconium Alloy Tubular Products." Each application, publication, and patent listed in this paragraph are hereby incorporated by reference in their entireties.

TECHNICAL FIELD OF THE INVENTION

The invention is referred to the nuclear technical field, particularly to the method of manufacturing zirconium alloy tubular products used as cladding and pressure tubes in water-cooled nuclear reactors, including the reactors of WWER type.

PRIOR ART

Zirconium alloys are used as the materials for structural components of nuclear power reactors due to their unique properties: low thermal neutrons absorption section, corrosion resistance in high-temperature water and the water steam medium, oxidation and hydrogen absorption resistance, low irradiation growth and other physical and mechanical properties. The properties of the tubular products depend on the chemical composition and each process operation from the ingot melting to the final finishing operations.

The patent "Method of Manufacturing Zirconium Alloy Tubular Products (Variants)" (RU 2123065C1 published on Mar. 12, 1997, cl. C22F/1/18), including production of the primary blank, production of the tubular billet, cold rolling of the tubular billet with intermediate and final annealing for binary zirconium alloy is already known.

The drawbacks of this method reside in the fact that no protective coating is applied on the billet prior to hot extrusion resulting in oxidation of the metal in the course of manufacturing process and reduction of the processability of tubular products, and no final finishing operations enabling to remove residual process contaminations from the surface of tubular products and to reduce the surface roughness are provided thus decreasing corrosion resistance of the products.

The patent "Method of Manufacturing Zirconium Alloy Products" RU 2110600C1 (published on May 10, 1998, cl. C22F/1/18) including manufacturing of the primary blank from the ingot by thermal forming, subsequent production of the intermediate billet by thermal forming, quenching and tempering of cut-to-length sections, thermal forming and tempering prior to cold rolling and performance of cold rolling is already known.

The drawbacks of this method reside in the fact that no protective coating is applied on the ingot prior to hot extrusion resulting in oxidation of the metal in the course of extrusion process and reduction of the processability of tubular products, and no final finishing operations enabling to remove residual process contaminations from the surface of the tubular products and reduce the surface roughness are provided thus decreasing corrosion resistance of the products.

The patent "Zirconium Alloy with the Improved Corrosion Resistance for Fuel Element Claddings and Their Manufacturing Method" US 2016/0307651A1 (published on Oct. 20, 2016, cl. G21C 3/07, B22D 21/00, B22D 7/00, C22C 16/00, C22F 1/18) is the closest to the claimed method. The method specifies the composition of corrosion-resistant zirconium alloy and the method for manufacturing of fuel element claddings made of this alloy, including the ingot melting, the ingot coating with the protective steel shell, thermal treatment of the ingot together with the shell prior to hot rolling, the hot rolling, removal of the protective steel coating, thermal treatment of hot-rolled tubular billets, three runs of cold rolling, intermediate thermal treatment after each rolling and final thermal treatment.

The main drawback of the method is insufficient processing of the material at the cold rolling stage with the total rolling draft of up to 60% per a run resulting in incomplete elimination of non-uniform hot-rolled structure. The drawbacks of the method also include: application of the carbon-containing steel shell interacting with zirconium alloy at the hot rolling temperature with potential generation of carbides. Moreover, the material recrystallization degree is one of the main factors defining processability and deformation resistance characteristics (resistance to thermal, radiation and thermal creep as well as to irradiation growth) of zirconium alloys. Low temperatures of the intermediate annealing (570° C. to 590° C. for the 1-st run, 560° C. to 580° C. for the 2-nd run, 560° C. to 580° C. for the 3-rd run) for the selected deformation manufacturing scheme (30-40% of deformation at the first and the third stages, and 50-60%—at the second stage of cold deformation) are insufficient for relaxation of residual stresses and completion of recrystallization processes that affects not only the material processability but also its deformation resistance characteristics, particularly under the impact of radiation. Use of the three-level long-term final annealing (1-st level—460° C. to 470° C., 2-nd level—510° C. to 520° C., 3-rd level—580° C. to 590° C.) enables to achieve the increased material strength level; in this case the deformation resistance characteristics are deteriorated primarily due to incomplete recrystallization process. The process flow diagram does not provide for any final finishing operations enabling to remove residual process contaminations from the surface of tubular products and reduce the surface roughness thus decreasing corrosion resistance of the products.

SUMMARY OF THE INVENTION

The object of this invention is to develop the method of manufacturing zirconium alloy tubular products of various diameters that can be used as cladding tubes in water-cooled nuclear reactors.

The technical result is improved processability of the material at all stages of hot and cold pressure shaping applied in the course of tubular product manufacturing as well as high corrosion resistance of the tubular products with stable characteristics of mechanical properties and deformation resistance.

The technical result is achieved with respect to the method of manufacturing tubular products of zirconium alloy containing (% wt.): niobium—0.9-1.7; iron—0.04-0.10; oxygen—0.03-0.10; silicon—less than 0.02, carbon—less than 0.02, zirconium—all the rest, including the ingot melting by multiple vacuum arc remelting, mechanical processing of the ingot, heating, hot working of the ingot, subsequent mechanical processing for production of tubular billets, heat treatment of tubular billets, application of the protective coating and heating to the hot pressing temperature, hot pressing, removal of the protective coating, multistage cold radial forging, vacuum thermal treatment, multiple cold rolling with the total deformation degree of 50-80% per a run and the tubular coefficient of Q=1.0-2.7 with intermediate vacuum thermal treatment after each cold rolling operation, and the final vacuum thermal treatment of the resulting tubular products is carried out at the final size with subsequent final finishing operations.

Hot working is carried out by multi-stage forging or screw rolling in the temperature range from 980° C. to 700° C. with a total deformation degree of 67-83% and with intermediate heating at the temperature from 850° C. to 800° C.

Tubular billets are produced by drilling and subsequent boring of the axial center hole in the ingot divided into definite cut length after the hot working.

Thermal treatment of the tubular billets is carried out at the temperature from 730° C. to 780° C.

Hot pressing of the tubular billet is carried out at the reheat temperature from 750° C. to 650° C. and the elongation ratio of $\mu$=8.9-12.9.

Multi-stage cold radial forging of tubular billets is carried out with the rolling draft of 33%.

Vacuum thermal treatment of the tubular billets in the intervals between cold rolling and final vacuum heat treatment is carried out at the temperature of 565-630° C.

Vacuum thermal treatment is carried out at the residual pressure of $1 \cdot 10^{-4}$-$1 \cdot 10^{-5}$ mm Hg in the furnace.

Chemical and mechanical processing of the surfaces is carried out at the final size of the tubular products.

The selected proportion of alloying components in the zirconium alloy provides for the processing properties, corrosion resistance, stable characteristics of mechanical properties and deformation resistance of the tubular products.

The advantage of the tubular product manufacturing in accordance with the claimed method resides in the fact that hot working of the ingot (forging or screw rolling) ensures uniform processing of the cast structure along the ingot length and cross-section, and application of the copper protective coating provides for protection against gas pickup and prevents diffusion interaction between the coating and the billet. Cold rolling with intermediate thermal treatment provides for homogeneous recrystallized structure of the tubular products with high mechanical properties and also the required anisotropy of properties in the transverse and longitudinal direction. Final finishing operations provide for the roughness Ra of less than 0.8 µm on the outer and inner surface thus increasing stability of the corrosion properties. The inner surface roughness enables to improve the processes of fuel pellets loading into the tubular products.

EMBODIMENT OF THE INVENTION

The method is embodied in the following way:

Example 1

In accordance with the claimed technical solution the technology of manufacturing zirconium tubular products includes the following operations. Melting of the alloy ingot consisting of: niobium—0.97-1.03% wt., iron—0.080-0.010% wt., oxygen—0.040-0.045% wt., silicon—0.003-0.004% wt., carbon—0.0044-0.0046% wt., zirconium—all the rest. The initial alloying components are mixed with electrolytic zirconium powder, and then consumable electrodes are formed and melted by two-stage vacuum arc remelting. The ingot is processed mechanically. The ingot is heated to the temperature from 980° C. to 930° C. in the electric resistance-type furnace. Multi-stage forging or screw rolling of the ingot after heating is carried out within the temperature range from 980° C. to 700° C. with intermediate heat-up in the electric resistance-type furnace within the temperature range from 850° C. to 800° C. The total deformation $\Sigma\varepsilon$ in the course of hot working of the ingot lies in the range from 67 to 83%. The ingot is divided into the definite cut length in the size of Ø249×43 mm or Ø199'36.5 mm and processed mechanically, and the tubular billets are obtained by drilling and subsequent boring of an axial central hole in them. Thermal treatment of the tubular billets at the temperatures from 730° C. to 780° C. The roughness of the surface of the tubular billets is no more than $R_a$=2.5 µm. Then copper coating is applied on the tubular billets in order to protect them against gas pickup in the course of subsequent heating and hot pressing. Heating of the tubular billets for hot pressing is carried out in a combined method, first in an induction furnace, and then in an electric resistance furnace to equalize the temperature along the height and cross-section of the tubular billet. The heating temperature of the tubular billet prior to pressing is within the range from 650° C. to 750° C. Pressing is carried out with the elongation ratio of µ within the range from 11.4 to 12.9. Further, the copper coating is removed and preliminary operations for multiple cold rolling are carried out. To reduce metal losses into chips during machining of a tubular billet, multistage radial forging is carried out on an SKK radial forging machine with deformation ($\varepsilon$=33% per pass). Next, the tubular billets are sent for vacuum thermal treatment (T=565° C.). The tubular billets are rolled on cold-rolling mills of the HPT, KPW types in three passes with a total deformation $\Sigma\varepsilon$ per pass from 60 to 80%, while the tubular coefficient Q lies in the range of 1.0-2.7. Intermediate and finishing thermal treatments are carried out within the temperature range from 590° C. to 630° C. in vacuum with a residual pressure in the furnace not higher than $1 \cdot 10^{-4}$-$1 \cdot 10^{-5}$ mm Hg. After the final vacuum thermal treatment of the tubular products at the temperature from 590° C. to 630° C., final finishing operations are carried out: package or jet etching, abrasive processing of the inner surface, grinding and polishing of the outer surface are performed.

Zirconium alloy tubular products manufactured in accordance with the claimed technical solution are characterized with the following properties (Table 1, Example 1).

Example 2

In accordance with the claimed technical solution the technology of manufacturing zirconium tubular products includes the following operations. Melting of the alloy ingot consisting of: niobium—0.99-1.08% wt., iron—0.051-0.057% wt., oxygen—0.075-0.080% wt., silicon—0.003-0.004% wt., carbon—0.0032-0.0036% wt., zirconium—all the rest. The initial alloying components are mixed with zirconium magnesiothermal sponge, and then consumable electrodes are formed and melted by two-stage vacuum arc remelting. The ingot is processed mechanically. The ingot is heated to the temperature from 930° C. to 980° C. in the electric resistance-type furnace. Multi-stage forging of the ingot after heating is carried out within the temperature range from 980° C. to 700° C. with intermediate heat-up in the electric resistance-type furnace within the temperature range from 800° C. to 850° C. The total deformation $\Sigma\varepsilon$ in the course of hot working of the ingot is 67%. The ingot is divided into the definite cut length in the size of Ø249×49 mm and processed mechanically, and the tubular billets are obtained by drilling and subsequent boring of an axial central hole in them. Thermal treatment of the tubular billets at the temperatures from 730° C. to 780° C. The roughness of the surface of the billets is no more than $R_a$=2.5 µm. Then copper coating is applied on the tubular billets in order to protect them against gas pickup in the course of subsequent heating and hot pressing. Heating of the tubular billets for hot pressing is carried out in an induction furnace, and then in an electric resistance furnace to equalize the temperature along the height and cross-section of the billet. The heating temperature of the tubular billets prior to pressing is within the range from 650° C. to 670° C. Pressing is carried out with the elongation ratio µ equal to 8.9. Further, the copper coating is removed. In order to reduce metal losses into chips during machining of a tubular billet, multistage radial forging is carried out on an SKK radial forging machine with deformation (ε=33% per pass). Next, the tubular billets are sent for vacuum thermal treatment (T=565° C.). The tubular billets are rolled on cold-rolling mills of the HPT, KPW types in four passes with a total deformation Σε per pass from 50 to 78%, while the tubular coefficient Q lies in the range of 1.0-2.3. Intermediate thermal treatments are carried out in the temperature range from 570° C. to 600° C. in vacuum with a residual pressure in the furnace not higher than $1 \cdot 10^{-4}$-$1 \cdot 10^{-5}$ mm Hg. After the final vacuum thermal treatment of the tubular products at the temperature from 590° C. to 595° C., final finishing operations are carried out: package or jet etching, abrasive processing of the inner surface, grinding and polishing of the outer surface are performed.

INDUSTRIAL APPLICABILITY

Zirconium alloy tubular products manufactured in accordance with the claimed technical solution are characterized with the following properties (Table 1, Example 2).

Thus, the presented tube manufacturing method enables to produce tubular products with high corrosion resistance, stable characteristics of mechanical properties and deformation resistance.

TABLE 1

Properties of the tubes manufactured of the Zr—Nb system alloy in accordance with the claimed technical solution

| No. | Chemical composition of the alloy, % (wt.) | Number of remeltings/ weight of the final remelting ingot, tons | Tube dimensions, mm | Mechanical properties $T_{test.}$ = 20° C. | | | | | |
|---|---|---|---|---|---|---|---|---|---|
| | | | | $\sigma_b^\perp$, MPa | $\sigma_{0.2}^\perp$, MPa | $\delta^\perp$, % | $\sigma_b^{//}$, MPa | $\sigma_{0.2}^{//}$, MPa | $\delta^{//}$, % |
| 1 | niobium - 0.99-1.08; iron - 0.051-0.057; oxygen - 0.075-0.080; silicon - 0.003-0.004; carbon - 0.0032-0.0036; Zr - all the rest | 2 vacuum arc remeltings/3.5 | Ø13.58 × 11.70 Ø13.00 × 11.00 Ø9.10 × 7.73 Ø10.30 × 8.80 Ø9.10 × 7.93 Ø8.90 × 7.73 Ø9.50 × 8.33 | 440-450 | 360-390 | 32-38 | — | — | — |
| 2 | niobium - 0.99-1.08; iron - 0.051-0.057; oxygen - 0.075-0.080; silicon - 0.003-0.004; carbon - 0.0032-0.0036; Zr - all the rest | 2 vacuum arc remeltings/3.5 | Ø13.58 × 11.70 Ø13.00 × 11.00 Ø9.10 × 7.73 Ø10.30 × 8.80 Ø9.10 × 7.93 Ø8.90 × 7.73 Ø9.50 × 8.33 | 440-450 | 360-390 | 32-38 | — | — | — |

| No. | Mechanical properties | | | | | | Corrosion 400° C. τ = 72 hours | |
|---|---|---|---|---|---|---|---|---|
| | $\sigma_b^\perp$, MPa $T_{test.}$ = 20° C. | $\sigma_{0.2}^\perp$, MPa | $\delta^\perp$, % | $\sigma_b^{//}$, MPa $T_{test}$ = 380° C. | $\sigma_{0.2}^{//}$, MPa | $\delta^{//}$, % | Weight gain, mg/dm$^2$ | Roughness Ra, µm |
| 1 | 190-210 | 160-190 | 38-48 | 190-220 | 108-130 | 58-63 | 10-14 | Outer surf. < 0.4 Inner surf. < 0.8 |
| 2 | 190-210 | 160-190 | 38-48 | 190-220 | 108-130 | 58-63 | 10-14 | Outer surf. < 0.4 Inner surf. < 0.8 |

What is claimed is:

1. The method of manufacturing zirconium alloy tubular products from zirconium alloy ingot containing (% wt.): niobium—0.9-1.7; iron—0.04-0.10; oxygen—0.03-0.10; silicon—less than 0.02, carbon—less than 0.02, zirconium—all the rest, including the ingot melting by multiple vacuum arc remelting, mechanical processing of the ingot, heating, hot working of the ingot and subsequent mechanical processing for production of the tubular billets, heat treatment of tubular billets, application of a protective coating on the tubular billets to protect against gas saturation during heating and hot pressing and heating of the tubular billets to the hot pressing temperature, hot pressing, removal of the protective coating, multi-stage cold radial forging, vacuum thermal treatment, multiple cold rolling with the total deformation degree of 50-80% per a run and the tubular coefficient of Q=1.0-2.7 with intermediate vacuum thermal treatment after each cold rolling operation, and final vacuum thermal treatment of the tubular products is carried out at the final size with subsequent final finishing operations.

2. The method as per claim 1 featuring the hot working is carried out by multi-stage forging or screw rolling in the temperature range from 980° C. to 700° C. with a total deformation degree of 67-83% and with intermediate heating at the temperature from 850° C. to 800° C.

3. The method as per claim 1 featuring the tubular billets are produced by drilling and subsequent boring of the axial center hole in the ingot divided into definite cut lengths after the hot working processing.

4. The method as per claim 1 featuring the thermal treatment of the tubular billets is carried out at the temperature from 730° C. to 780° C.

5. The method as per claim 1 featuring the hot pressing of the tubular billet is carried out at the heating temperature from 750° C. to 650° C. with the elongation ratio of $\mu$=8.9-12.9.

6. The method as per claim 1 featuring the multi-stage cold radial forging of tubular billets is carried out with a rolling draft of 33%.

7. The method as per claim 1 featuring the vacuum thermal treatment of the tubular billets in the intervals between cold rolling and the final vacuum thermal treatment is carried out at the temperature of 565-630° C.

8. The method as per claim 7 featuring the vacuum thermal treatment is carried out at the residual pressure of $1 \cdot 10^{-4}$-$1 \cdot 10^{-5}$ mm Hg in the furnace.

9. The method as per claim 1 featuring the finishing operations include chemical and mechanical treatment at the final size of the tubular products.

* * * * *